United States Patent
Eo et al.

(10) Patent No.: US 12,139,014 B2
(45) Date of Patent: Nov. 12, 2024

(54) APPARATUS AND METHOD FOR CONTROLLING VEHICLE

(71) Applicants: Hyundai Motor Company, Seoul (KR); Kia Corporation, Seoul (KR)

(72) Inventors: Hee Jae Eo, Seoul (KR); Kyowoong Choo, Seoul (KR); Yeon Ji Kim, Seoul (KR); Jong Ha Moon, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 594 days.

(21) Appl. No.: 17/487,996

(22) Filed: Sep. 28, 2021

(65) Prior Publication Data

US 2022/0314794 A1   Oct. 6, 2022

(30) Foreign Application Priority Data

Apr. 2, 2021   (KR) .................. 10-2021-0043374

(51) Int. Cl.
*B60K 35/00*   (2024.01)
*B60K 35/10*   (2024.01)
(Continued)

(52) U.S. Cl.
CPC .............. *B60K 35/00* (2013.01); *B60K 35/10* (2024.01); *B62D 1/046* (2013.01); *G04F 8/003* (2013.01);
(Continued)

(58) Field of Classification Search
CPC ........ B60K 35/00; B60K 35/10; B60K 35/28; B60K 35/60; B60K 2360/164;
(Continued)

(56) References Cited

U.S. PATENT DOCUMENTS 6,035,735 A * 3/2000 Graf .................... F16H 59/0204
701/52
6,544,141 B1 * 4/2003 Fuchs ............... F16H 61/66254
477/44
(Continued)

FOREIGN PATENT DOCUMENTS

EP           1914141 B       8/2009
JP        H 10-308136 A     11/1998

OTHER PUBLICATIONS

Kern et al, D. Design Space for Driver-based Automotive User Interfaces, Google Scholar, Proceedings of the First International Conference on Automotive User Interfaces and Interactive Vehicular Applications, (AutomotiveUI 2009), Sep. 2009, pp. 3-10. (Year: 2009).*

(Continued)

*Primary Examiner* — Russell Frejd
(74) *Attorney, Agent, or Firm* — Morgan, Lewis & Bockius LLP

(57) ABSTRACT

An apparatus and a method for controlling a vehicle may include at least two buttons provided on a steering wheel, a processor electrically connected to the at least two buttons, and storage that stores instructions executed by the processor, wherein the processor may map and set a vehicle function to the at least two buttons, detect a button manipulated among the at least two buttons, and perform a vehicle function mapped to the manipulated button based on the vehicle function mapped to the operated button and a current vehicle state.

18 Claims, 9 Drawing Sheets

(51) Int. Cl.
  *B60K 35/28* (2024.01)
  *B60K 35/60* (2024.01)
  *B62D 1/04* (2006.01)
  *G04F 8/00* (2006.01)

(52) U.S. Cl.
  CPC .............. *B60K 35/28* (2024.01); *B60K 35/60* (2024.01); *B60K 2360/164* (2024.01); *B60K 2360/782* (2024.01)

(58) Field of Classification Search
  CPC ........ B60K 2360/782; B60K 2360/115; B60K 2360/139; B60K 2360/122; B62D 1/046; B62D 1/04; G04F 8/003; B60W 50/08; B60W 2050/0005; B60W 2050/146; B60R 16/037
  See application file for complete search history.

(56) References Cited

U.S. PATENT DOCUMENTS

| | | | | |
|---|---|---|---|---|
| 2016/0244022 A1* | 8/2016 | Lippman | .................. | B60R 25/20 |
| 2019/0263439 A1* | 8/2019 | Pramsoler | ............. | G06F 3/0482 |
| 2019/0308638 A1* | 10/2019 | Ritter | ..................... | B60K 35/10 |
| 2020/0329216 A1* | 10/2020 | Ribighini | .................. | B60R 1/28 |

OTHER PUBLICATIONS

Tonnis et al., M. A Survey of Challenges Related to the Design of 3D User Interfaces for Car Drivers, Google Scholar, Proceedings of the 2006 IEEE Symposium on 3D User Interfaces 2006, Mar. 2006, pp. 127-134. (Year: 2006).*

* cited by examiner

APPARATUS AND METHOD FOR CONTROLLING VEHICLE

CROSS-REFERENCE TO RELATED APPLICATION

The present application claims priority to Korean Patent Application No. 10-2021-0043374, filed on Apr. 2, 2021, the entire contents of which is incorporated herein for all purposes by this reference.

BACKGROUND OF THE INVENTION

Field of the Invention

The present invention relates to an apparatus and a method for controlling a vehicle.

Description of Related art

In a vehicle, control buttons of convenient devices (e.g., an audio, an air conditioner, hands-free, and the like) with high operation frequency are mounted on a steering wheel to prevent the driver's inattention to look forward due to button manipulation while driving. Such control buttons are mapped to specific functions, so that the frequency of use may be low depending on the user.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus and a method for controlling a vehicle function of mapping a desired vehicle are configured to a plurality of buttons provided on a steering wheel according to the needs of a user.

The technical problems to be solved by the present inventive concept are not limited to the aforementioned problems, and any other technical problems not mentioned herein will be clearly understood from the following description by those skilled in the art to which various exemplary embodiments of the present invention pertains.

According to various aspects of the present invention, an apparatus of controlling a vehicle includes at least two buttons provided on a steering wheel, a processor electrically connected to the at least two buttons, and storage that stores instructions executed by the processor, wherein the processor may map and set a vehicle function to the at least two buttons, detect a button manipulated among the at least two buttons, and perform a vehicle function mapped to the manipulated button based on the vehicle function mapped to the operated button and a current vehicle state.

The processor may map a driving mode function having a vehicle feature to the at least two buttons on a one-to-one basis.

The processor may compare a driving mode corresponding to the driving mode function with a current driving mode of the vehicle when the processor concludes that the vehicle function mapped to the operated button is the driving mode function, and change a driving mode of the vehicle to the driving mode corresponding to the driving mode function when the processor concludes that the driving mode corresponding to the driving mode function is inconsistent with the current driving mode.

The processor may change the driving mode of the vehicle to a default driving mode corresponding to a system logic or a previous driving mode when the processor concludes that the driving mode corresponding to the driving mode function matches the current driving mode.

The processor may change the driving mode of the vehicle to a next driving mode in a predetermined order when the processor concludes that the driving mode corresponding to the driving mode function matches the current driving mode.

The processor may set a lap timer start function to one of the at least two buttons, and automatically set a lap timer stop and initialization function to a remaining button of the at least two buttons.

The processor may start a lap timer when an operation of a button to which the lap timer start function is set is detected in a state in which the lap timer is not started, and ignore an input of a corresponding button when an operation of the corresponding button to which the lap timer stop and initialization function is set is detected.

The processor may read and record a timer value from the lap timer when the operation of the button to which the lap timer start function is set is detected in a state in which the lap timer is started, and stop the lap timer when the operation of the button to which the lap timer stop and initialization function is set is detected.

The processor may restart the lap timer when the operation of the button to which the lap timer start function is set is detected in a state in which the lap timer is stopped, and initialize the lap timer when the operation of the button to which the lap timer stop and initialization function is set is detected.

The processor may output, to a display device, information on guiding changes in a vehicle state corresponding to the performing of the vehicle function mapped to the operated button.

According to various aspects of the present invention, a method of controlling a vehicle includes mapping and setting a vehicle function to at least two buttons provided on a steering wheel, detecting a button manipulated among the at least two buttons, identifying a vehicle function mapped to the manipulated button, and performing the vehicle function mapped to the manipulated button based on the identified vehicle function and a current vehicle state.

The setting of the vehicle functions may include mapping a driving mode function having a vehicle feature to the at least two buttons on a one-to-one basis.

The performing of the vehicle function may include comparing a driving mode corresponding to the driving mode function with a current driving mode of the vehicle when the processor concludes that the vehicle function mapped to the operated button is the driving mode function, and changing a driving mode of the vehicle to the driving mode corresponding to the driving mode function when the driving mode corresponding to the driving mode function is inconsistent the current driving mode.

The performing of the vehicle function may include changing the driving mode of the vehicle to a default driving mode corresponding to a system logic or a previous driving mode when the processor concludes that the driving mode corresponding to the driving mode function matches the current driving mode.

The performing of the vehicle function may include changing the driving mode of the vehicle to a next driving mode in a predetermined order when the processor concludes that the driving mode corresponding to the driving mode function matches the current driving mode.

The setting of the vehicle functions may include setting a lap timer start function to one of the at least two buttons, and automatically setting a lap timer stop and initialization function to a remaining button of the at least two buttons.

The setting of the vehicle functions may further include outputting a pop-up, to a display device, indicating that the lap timer stop and initialization function is automatically set to the remaining button when the lap timer start function is set to the one of the at least two buttons.

The performing of the vehicle function may include starting a lap timer when an operation of a button to which the lap timer start function is set is detected in a state in which the lap timer is not started, and ignoring an input of a corresponding button when an operation of the corresponding button to which the lap timer stop and initialization function is set is detected.

The performing of the vehicle function may include reading and recording a timer value from the lap timer when the operation of the button to which the lap timer start function is set is detected in a state in which the lap timer is started, and stopping the lap timer when the operation of the button to which the lap timer stop and initialization function is set is detected.

The performing of the vehicle function may include restarting the lap timer when the operation of the button to which the lap timer start function is set is detected in a state in which the lap timer is stopped; and initializing the lap timer when the operation of the button to which the lap timer stop and initialization function is set is detected.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
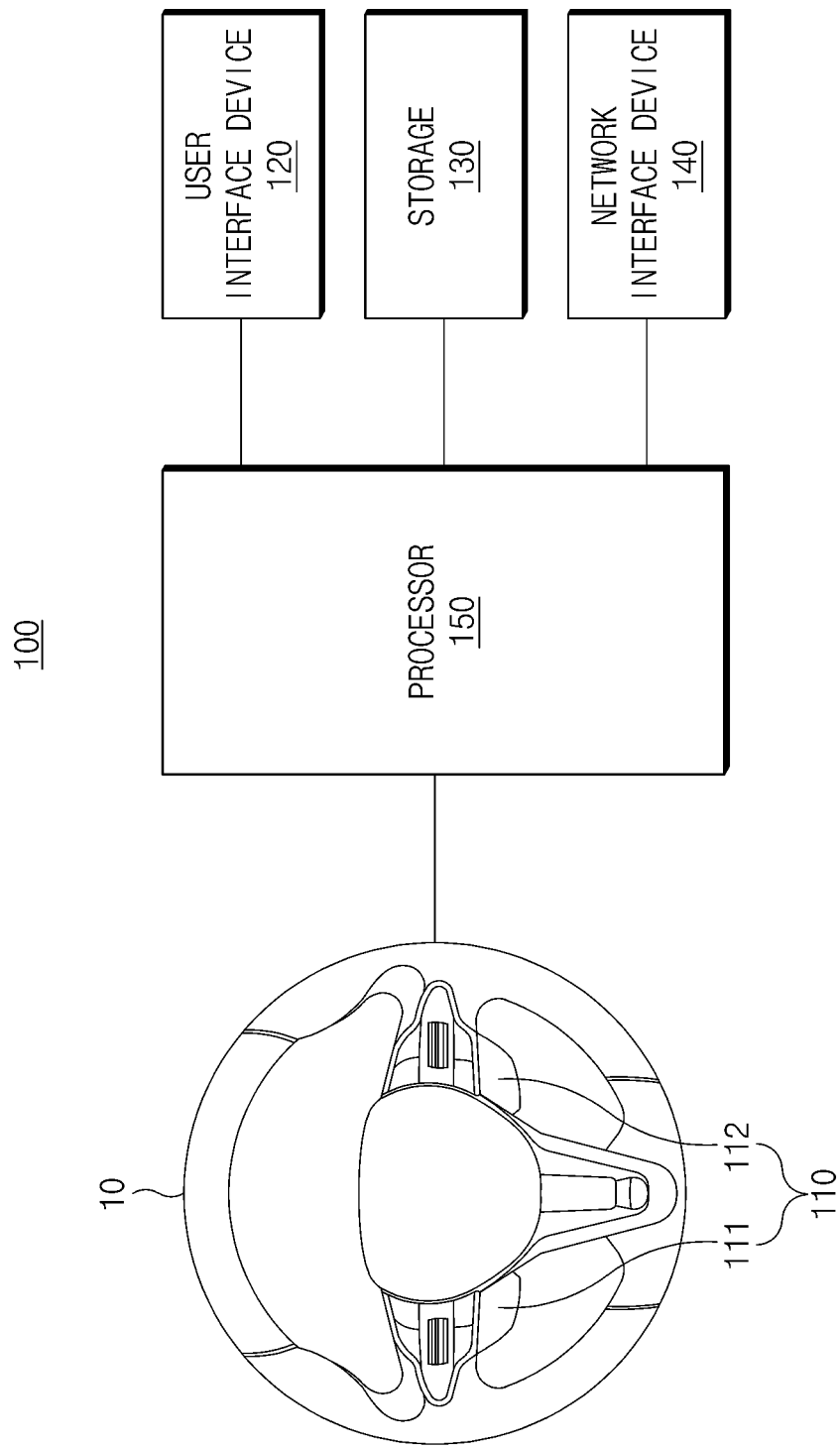
FIG. 1 is a diagram illustrating an apparatus of controlling a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present invention, a detailed description of well-known features or functions will be ruled out in order not to unnecessarily obscure the gist of the present invention.

In describing the components of the exemplary embodiment according to various exemplary embodiments of the present invention, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which various exemplary embodiments of the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a diagram illustrating an apparatus of controlling a vehicle according to various exemplary embodiments of the present invention.

An apparatus 100 for controlling a vehicle may include at least two buttons 110, a user interface device (Human interface device: HID) 120, storage 130, a network interface device 140, and a processor 150, and the like.

At least two or more buttons 110 (111 and 112) may be provided (installed) on a steering wheel 10. As shown in FIG. 1, the at least two buttons 110, that is, a first button 111 and a second button 112 may be mounted on the steering wheel 10 at positions that are symmetrical with each other. The at least two buttons 110 may be arranged at a position that can be operated using a thumb or the like while a user (e.g., a driver) holds the steering wheel 10.

The user interface device 120 may receive data from a user or output information (data) that the user can recognize.

The user interface device 120 may include an input device that generates data according to a user's manipulation and an output device that outputs information according to an operation of the processor 150. As the input device, a keyboard, a keypad, a button, a touch pad, and/or a touch screen may be used. Furthermore, a display device, an audio output device (e.g., a speaker, or the like), and/or a haptic device (e.g., a vibrator) may be used as the output device. As the display device, a head-up display (HUD), audio video navigation (AVN), a cluster and/or an infotainment system display may be used.

The storage 130 may store function mapping information for each button, vehicle control information for each function, system logic and/or setting information, and the like. In the function mapping information for each button, a vehicle function mapped to each button provided on the steering wheel 10 may be defined. In the vehicle control information for each function, a control signal to be transmitted to at least one electric control unit (ECU) matched to (corresponding to) each vehicle function may be defined. The function mapping information for each button and vehicle control information for each function may be provided in a form of a table. The storage 130 may store input data and/or output data corresponding to an operation of the processor 150.

The storage 130 may be a non-transitory storage medium that stores instructions executed by the processor 150. The storage 130 may be implemented with at least one of storage media such as a flash memory, a hard disk, a solid state disk (SSD), a secure digital card (SD card), a random access memory (RAM), a static random access memory (SRAM), a read only memory (ROM), a programmable read only memory (PROM), an electrically erasable and programmable ROM (EEPROM), an erasable and programmable ROM (EPROM), a register, web storage, and the like. The storage 130 may be a memory implemented with a separate chip, or may be implemented with the processor 150 in a single chip.

The network interface device 140 may connect the vehicle control device 100 to a network and support communication between devices connected to the corresponding network such as an ECU (e.g., an engine control unit (ECU), a shift control device, a steering control device, and the like), a vehicle terminal (e.g., a navigation device, and the like), a mobile terminal (e.g., a smart phone, a computer, a laptop computer, a tablet, and the like) and the like. In the instant case, the network may be implemented with a vehicle network such as a controller area network (CAN), a media oriented systems transport (MOST) network, a local interconnect network (LIN), Ethernet, X-by-wire (Flexray), and the like, and/or a wireless network such as Wi-Fi, Bluetooth, near field communication (NFC), radio frequency identification (RFID), mobile communication, and the like.

The processor 150 may control the overall operation of the apparatus 100 for controlling a vehicle. The processor 150 may be implemented with at least one of processing devices such as an application specific integrated Circuit (ASIC), a digital signal processor (DSP), a programmable logic device (PLD), field programmable gate arrays (FPGAs), a central processing unit (CPU), microcontrollers, microprocessors, and the like.

The processor 150 may determine one of the at least two buttons 110, that is, the first button 111 and the second button 112 as a setting target button corresponding to a user's manipulation. The processor 150 may determine a setting target button and enter a button setting mode. For example, when the processor 150 may enter a first button setting mode when a long press input of the first button 111 is detected, and a second button setting mode when a long press input of the second button 112 is detected.

When entering the button setting mode, the processor 150 may output a button setting screen to a display device of the user interface device 120. The processor 150 may select one from a plurality of vehicle functions displayed on the button setting screen based on a user input. The plurality of vehicle functions may include a driving mode function and/or an infotainment function. The driving mode function may include a first driving mode function, a second driving mode function, a third driving mode function, a fourth driving mode function, a first custom mode function, a second custom mode function, and the like.

The first driving mode function makes it possible to select one of a plurality of first driving modes preset corresponding to the driver's taste and road conditions, for example, driving modes such as a normal mode, a sports mode, and an eco mode as the driving mode of the vehicle. In the instant case, the normal mode is a mode in which the suspension, steering and engine are controlled to be suitable for comfortable driving. The sports mode is a mode in which steering power, engine and transmission operation are controlled to be suitable for sporty driving. The eco mode is a mode in which the operations of the engine and transmission are controlled to improve the fuel efficiency of the vehicle. The second driving mode function makes it possible to select the second driving mode (e.g., N mode) in which the overall vehicle system is controlled to perform high performance driving as the driving mode of the vehicle. The third driving mode function makes it possible to select one of the second driving mode and the first custom mode as the driving mode. The fourth driving mode function makes it possible to select one of the second driving mode and the second custom mode as the driving mode. The first custom mode function and the second custom mode function make it possible to select the first custom mode and the second custom mode as the driving mode, respectively. The first custom mode and the second custom mode may allow the user to individually adjust and set the engine, transmission, steering, suspension, revolution matching, electronic limited slip differential (e-LSD), electronic stability control (ESC), exhaust sound, and/or the strength of double clutch transmission (DCT) function according to the user's needs. The infotainment function may include functions such as starting of a lap timer, stopping and initializing of the lap timer, navigation control, and the like.

The processor 150 may map the selected vehicle function to the setting target button, that is, the first button 111 or the second button 112 on a one-to-one basis. In the instant case, the processor 150 may map the same vehicle function or different vehicle functions to the first button 111 and the second button 112. The processor 150 may store the mapping result as function mapping information for each button in the storage 130.

When the user operates the first button 111 or the second button 112 in a state in which vehicle functions are mapped (set) to the first button 111 and the second button 112, respectively, the processor 150 may detect a manipulation signal (or event) generated by the button manipulation. The processor 150 may identify the vehicle function mapped to the button (operation button) on which an operation is detected based on the function mapping information for each button stored in the storage 130 and execute the identified vehicle function. For example, when the first custom mode function is set (designated or mapped) to the first button 111 and the manipulation of the first button 111 is detected, the processor 150 may switch (change) the driving mode of the vehicle into the first custom mode.

The processor 150 may control the operation of the vehicle function based on the current vehicle state when the vehicle function is executed. When executing the driving mode function, the processor 150 may determine switching (changing) of the driving mode depending on the current driving mode of the vehicle. As an example, when the first custom mode function is executed and the current driving mode of the vehicle is not the first custom mode, the processor 150 may switch (change) the driving mode of the vehicle to the first custom mode. The processor 150 may control an engine, a transmission, a suspension, a steering, and the like based on the vehicle feature matched to the first custom mode and the current vehicle state. In other words, the processor 150 may transmit control signals to each electronic control device, that is, an engine control unit (ECU), a shift control device, a suspension control device, a steering control device, and the like to control the engine, transmission, suspension, steering, and the like.

When the current driving mode of the vehicle is the first custom mode when the driving mode function is executed, the processor 150 may change the driving mode of the vehicle to the default driving mode or the previous driving mode corresponding to the system logic stored in the storage 130.

As various exemplary embodiments of the present invention, when a 'Custom 1' mode function is designated (mapped) to the first button 111 and a 'N-Custom 2' mode function is designated (mapped) to the second button 112, the processor 150 may determine whether the current driving mode of the vehicle is the N mode when the driver presses the second button 112. When the current driving mode is not the N mode, the processor 150 may switch the driving mode to the N mode. Thereafter, when the driver presses the second button 112 again, the processor 150 may switch (change) the driving mode of the vehicle from the N mode to the 'Custom 2' mode. While driving in the 'Custom 2' mode, when the manipulation of the first button 111 is detected, the processor 150 may switch the driving mode of the vehicle from the 'Custom 2' mode to the 'Custom 1' mode.

The processor 150 may output, to a display device, notification information (feedback information) notifying the activation of a vehicle function in a response to the operation of the first button 111 or the second button 112 in a form of text, image, pop-up, and the like.

When mapping (setting) the lap timer function to the first button 111 and the second button 112 and the lap timer start function is set to the first button 111 corresponding to a user input, the processor 150 may automatically set the lap timer stop/initialization function to the second button 112. Furthermore, when lap timer stop/initialization function is set to the first button 111, the processor 150 may automatically set the lap timer start function to the second button 112. In the instant case, the processor 150 may output, to the display device, a pop-up window for informing that the function of the remaining button 112 or 111 is automatically set corresponding to the function setting of one of the first button 111 and the second button 112.

While the processor 150 displays a screen other than the lap timer screen (lap timer execution screen) on the display device, when at least one of the first button 111 and the second button 112 is operated and it is identified that the lap timer function is mapped to the corresponding operated button, the mapped screen displayed on the display device may be shifted to the lap timer screen. In the instant case, the processor 150 may perform only a screen transition operation and may not perform any additional operations.

Figure 2:
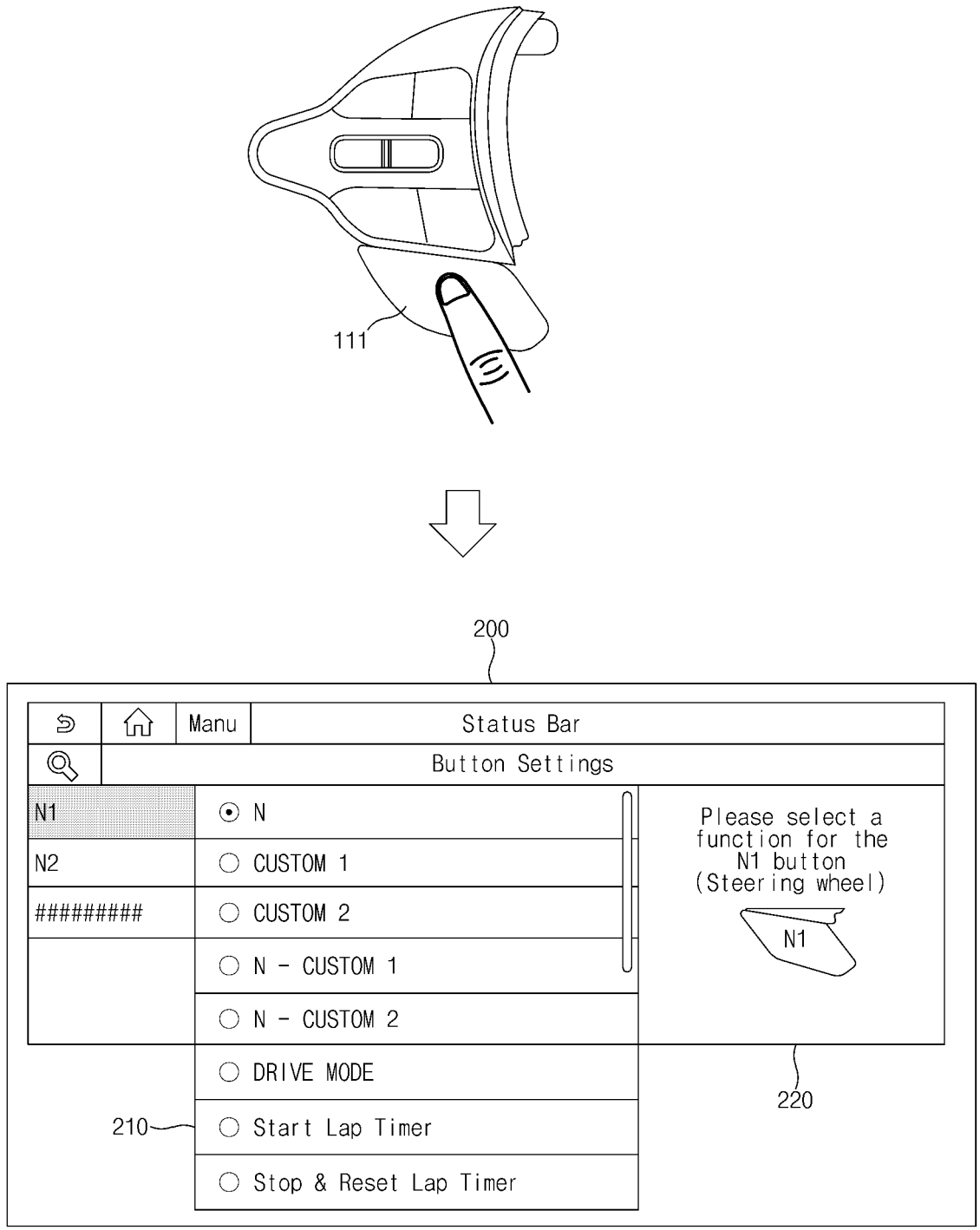
FIG. 2 and FIG. 3 are exemplary views exemplarily illustrating a button setting process according to various exemplary embodiments of the present invention.
Figure 3:
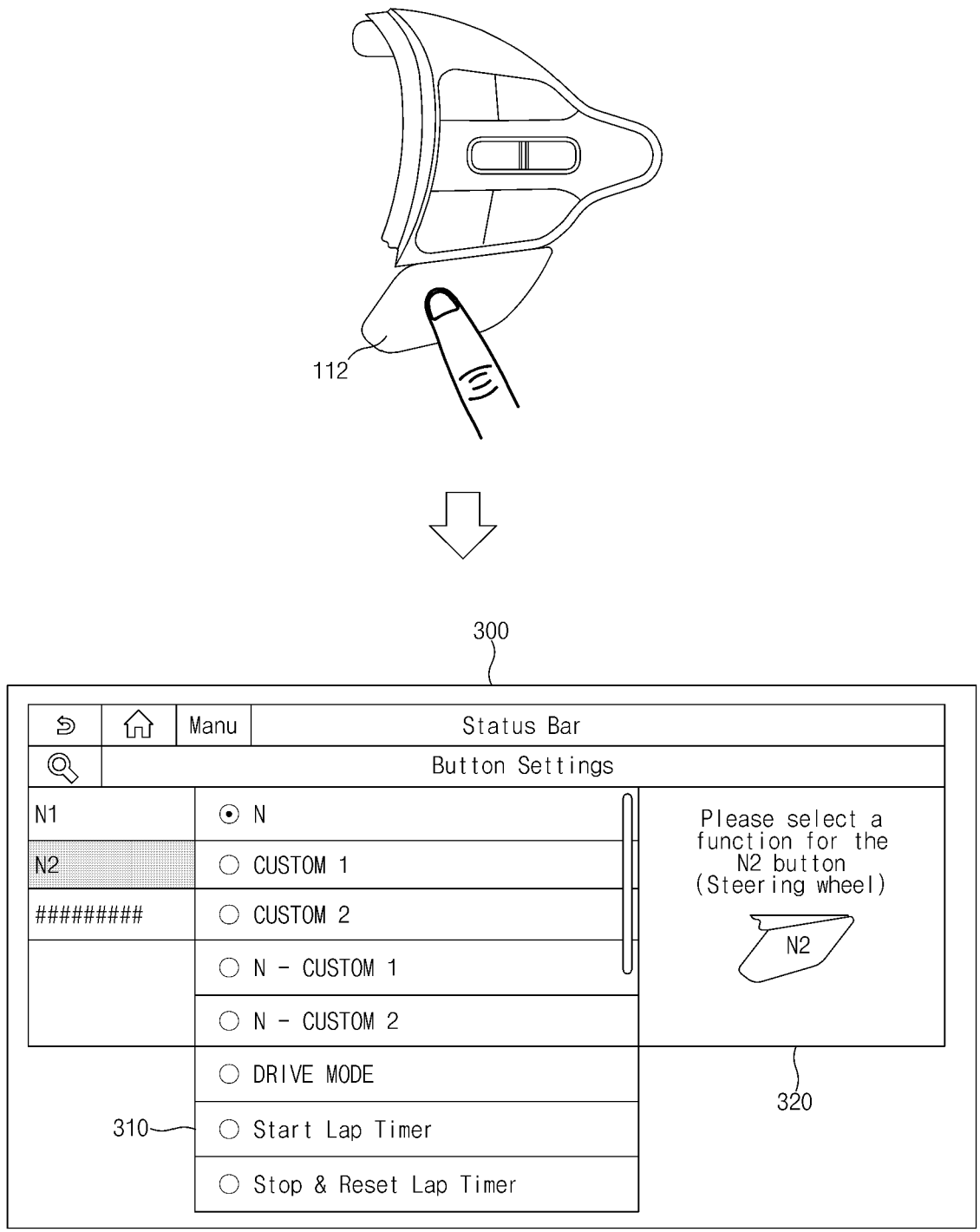

FIG. 2 and FIG. 3 are exemplary views exemplarily illustrating a button setting process according to various exemplary embodiments of the present invention. In the exemplary embodiment of the present invention, a process of mapping the driving mode function to the first button 111 and the second button 112 will be described.

Referring to FIG. 2, when a user long presses the first button 111, the processor 150 may detect (recognize) a long press input of the first button 111. When the processor 150 detects a long press input of the first button 111, it enters the button setting mode and can output a first button setting screen 200 to a display device (e.g., HUD and/or cluster, etc.). On the first button setting screen 200, a list 210 of vehicle functions which may be mapped to individual buttons and a button setting guide 220 may be displayed.

The processor 150 may select a vehicle function to be mapped (assigned) to the first button 111 on the first button setting screen 200 in a response to a user input received from the first button 111, the second button 112, or the user interface device 120. For example, the processor 150 may select one of functions of 'N', 'CUSTOM 1', 'CUSTOM 2', 'N-CUSTOM 1', 'N-CUSTOM 2', 'DRIVE MODE', 'Start Lap Timer', and 'Stop & Reset Lap Timer' based on the user input.

Thereafter, the processor 150 may map the first button 111 and the selected function and store the mapping result in the storage 130. For example, when the processor 150 detects the long press of the first button 111 again, it recognizes the present as a setting completion command, maps and sets the selected function to the first button 111, and stores the setting information.

Referring to FIG. 3, when the user long-presses the second button 112, the processor 150 may recognize (detect) an input of the second button 112. When the processor 150 recognizes the input (operation) of the second button 112, it enters the button setting mode and outputs a second button setting screen 300 to a display device (e.g., HUD and/or cluster, etc.). On the second button setting screen 300, a list 310 listing a plurality of vehicle functions which may be mapped to each button and a button setting guide 320 may be displayed.

The processor 150 may select any one vehicle function from among a plurality of vehicle functions to be assigned (mapped) to the second button 112 on the second button setting screen 300 according to a user input. For example, the processor 150 may select one of functions of 'N', 'CUSTOM 1', 'CUSTOM 2', 'N-CUSTOM 1', 'N-CUSTOM 2', 'DRIVE MODE', 'Start Lap Timer', and 'Stop & Reset Lap Timer' corresponding to the user input.

Thereafter, the processor 150 may map the second button 112 and the selected function on a one-to-one basis and store the mapping result in the storage 130.

Figure 4:
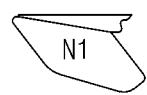
FIG. 4 and FIG. 5 are exemplary views exemplarily illustrating a button setting process according to various exemplary embodiments of the present invention.
Figure 5:

FIG. 4 and FIG. 5 are exemplary views exemplarily illustrating a button setting process according to various exemplary embodiments of the present invention. In the exemplary embodiment of the present invention, a process of mapping the lap timer function to the first button 111 and the second button 112 will be described.

Referring to FIG. 4, when a long press of the first button 111 is detected, the processor 150 may enter the button setting mode and may output a first button setting screen 400 to a display device. The processor 150 may select (determine) a lap timer stop/initialization (Stop & Reset Lap Timer) function as a function to be mapped to the first button 111 in a response to a user input.

Thereafter, the processor 150 may map and set the lap timer stop/initialization function to the first button 111. Furthermore, the processor 150 may automatically set a lap timer start (Start Lap Timer) function as a mapping function for the second button 112 when the lap timer stop/initialization function is set to the first button 111. When the function for the first button 111 is set, the processor 150 may output, to the display device, a pop-up window 410 guiding that the function for the second button 112 is automatically set.

When the 'Yes' button is selected among the 'Yes' button and the 'No' button included in the pop-up window 410 are selected, the processor 150 may map and set the lap timer stop/initialization function and the lap timer start function to the first button 111 and the second button 112 on a one-to-one basis, and may store the function mapping information (function setting information) in the storage 130. When the 'No' button of the pop-up window 410 is selected, the processor 150 may delete new function mapping information for the first button 111 and the second button 112 and maintain the previous function mapping information. Furthermore, the processor 150 may automatically set the lap timer stop/initialization function to the second button 112 when setting the lap timer start function to the first button 111.

Referring to FIG. 5, when the user long-presses the second button 112, the processor 150 may enter the button setting mode and may output a second button setting screen 500 to a display device. When the lap timer start function is selected on the second button setting screen 500, the processor 150 may map (set) the lap timer start function to the second button 112.

When the second button 112 and the lap timer start function are mapped on a one-to-one basis, the processor 150 may output, to the display device, a pop-up window 510 guiding that the lap timer stop/initialization function is automatically set to the first button 111.

When the 'Yes' button of the pop-up window 510 is selected, the processor 150 may map and set the lap timer stop/initialization function and the lap timer start function to the first button 111 and the second button 112, respectively, and may store the function mapping information in the storage 130. When the 'No' button of the pop-up window 510 is selected, the processor 150 may not perform mapping function for the first button 111 and the second button 112 and may maintain previous function mapping information. Furthermore, when the lap timer stop/initialization function is mapped and set to the second button 112, the processor 150 may automatically map and set the lap timer start function to the first button 111.

In the above-described embodiments, the process of matching and setting the lap timer start function and the lap timer stop/initialization function with the first button 111 and the second button 112 on a one-to-one basis has been described, but is not limited thereto. For example, the lap timer start function and the lap timer stop/initialization function may be matched and set with the first button 111 and the second button 112. In the instant case, the processor 150 may alternately perform a lap timer start and a lap timer stop/initialization whenever an operation of the first button 111 or the second button 112 is detected.

Figure 6:
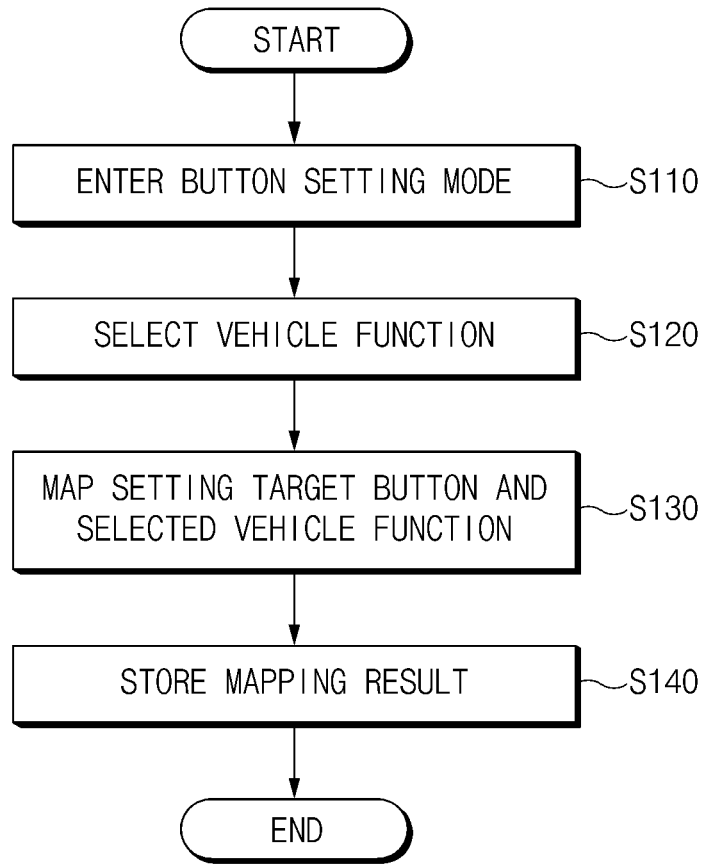
FIG. 6 is a flowchart illustrating a button setting method according to exemplary embodiments of the present invention.

FIG. 6 is a flowchart illustrating a button setting method according to exemplary embodiments of the present invention.

In S110, the processor 150 may enter a button setting mode in a response to a user input. When one of the at least two buttons 110 provided on the steering wheel 10 is long-pressed by the user, the processor 150 may detect it and determine the corresponding button as a setting target button. Furthermore, the processor 150 may enter a button setting mode for changing and setting a vehicle function mapped (matched) to the setting target button. When entering the button setting mode, the processor 150 may display a button setting screen of the setting target button (target button) on a display device such as a HUD, a cluster, an infotainment system display, or the like.

In S120, the processor 150 may select one from a plurality of vehicle functions which may be mapped to a setting target button in the button setting mode. The processor 150 may display a list of vehicle functions which may be mapped to a setting target button on the button setting screen. The processor 150 may select one vehicle function from a plurality of vehicle functions in a response to a user input.

In S130, the processor 150 may map the setting target button and the selected vehicle function. The processor 150 may set the same function or different functions to the plurality of buttons. For example, the processor 150 may assign a first driving mode function to the first button 111 and the second button 112, or the first custom mode function and the first driving mode function to the first button 111 and the second button 112, respectively. Furthermore, when assigning a specific function to one of the plurality of buttons, the processor 150 may automatically assign a function mapped to the remaining buttons. For example, when assigning the lap timer start function to the first button 111, the processor 150 may assign the lap timer stop/initialization function to the second button 112.

In S140, when the function mapping for the setting target button is completed, the processor 150 may store the mapping result in the storage 130. The processor 150 may update function mapping information for each button stored in the storage 130 based on the mapping result.

Figure 7:
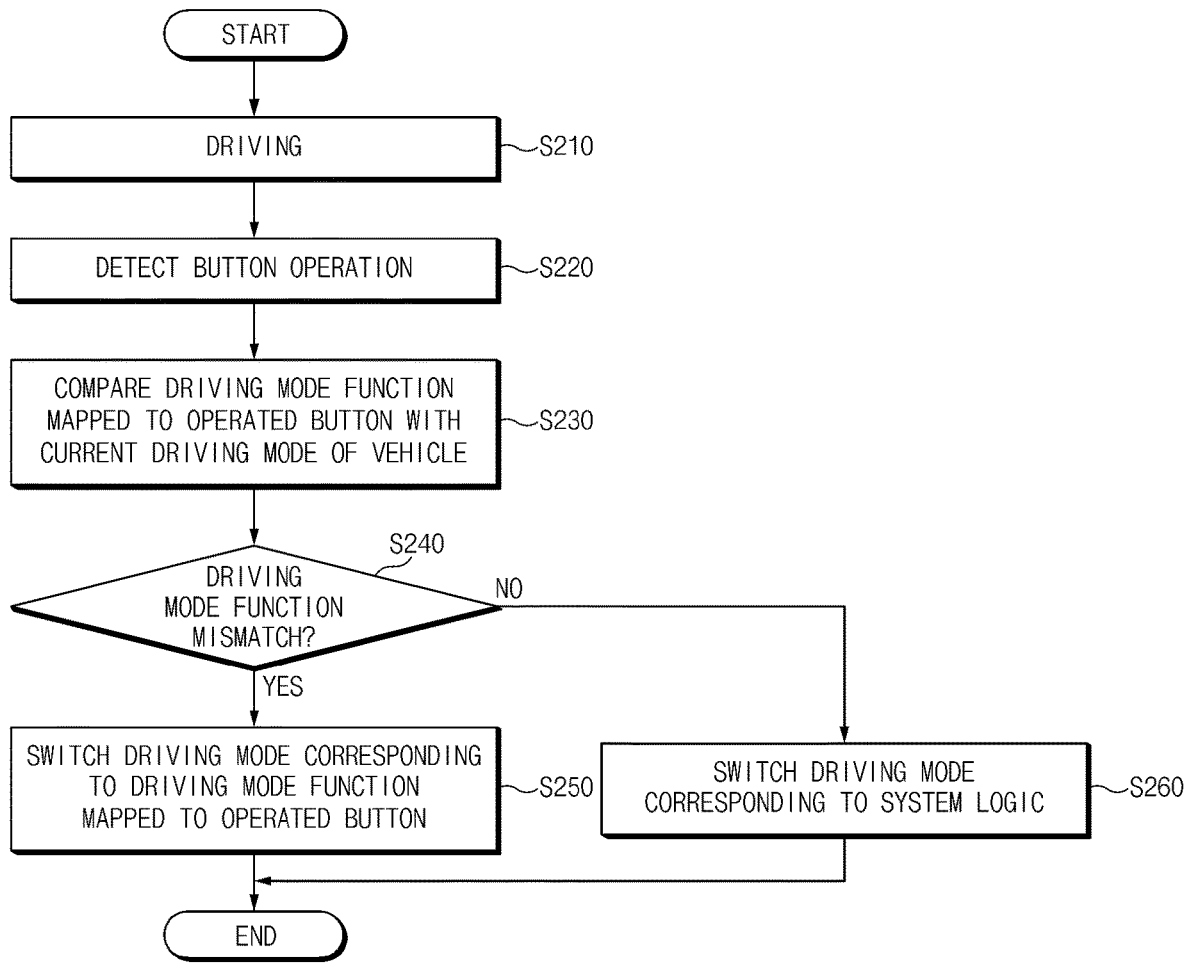
FIG. 7 is a flowchart illustrating a vehicle control method according to various exemplary embodiments of the present invention.

FIG. 7 is a flowchart illustrating a vehicle control method according to various exemplary embodiments of the present invention. In various exemplary embodiments of the present invention, a case in which a driving mode function is mapped to at least two or more buttons 110 provided on the steering wheel 10 will be referred to as an example.

When the vehicle starts driving, in S210, the processor 150 may recognize that the vehicle is driving.

In S220, the processor 150 may detect an operation of one of the at least two buttons 110 provided on the steering wheel 10. The processor 150 may recognize the operated button (operation button) among the at least two buttons 110.

In S230, the processor 150 may compare the driving mode function mapped to the detected operation button with the current driving mode function of the vehicle. In other words, the processor 150 may determine whether the driving mode function mapped to the operation button is the same as the driving mode function currently activated in the vehicle.

In S240, the processor 150 may determine whether the two driving mode functions match each other based on the comparison result.

When the two driving mode functions do not match each other, in S250, the processor 150 may switch the driving mode corresponding to the driving mode function mapped to the detected operation button.

Meanwhile, when the two driving mode functions match each other, in S260, the processor 150 may stop the driving mode function running and switch the driving mode based on the system logic.

For example, in a state in which the N mode function is set to the first button 111, the processor 150 may determine whether the current driving mode of the vehicle is the N mode when receiving the operation signal of the first button 111. When the current driving mode of the vehicle is not the N mode, the processor 150 may switch the vehicle driving mode to the N mode. Meanwhile, when the current driving mode of the vehicle is the N mode, the processor 150 may stop the N mode and change to the driving mode corresponding to the system logic. In other words, the processor 150 may switch the driving mode of the vehicle from the N mode to the default driving mode or the previous driving mode.

As various exemplary embodiments of the present invention, when the first custom mode function is set to the second button 112 and the operation of the second button 112 is detected, the processor 150 may identify the vehicle function mapped to the second button 112. The processor 150 may determine whether the identified vehicle function, that is, the first custom mode function is being executed. In other words, the processor 150 may determine whether the current driving mode of the vehicle is the first custom mode. When the current driving mode of the vehicle is not the first custom mode (i.e., when the first custom mode function is not being executed), the processor 150 may change the driving mode of the vehicle to the first custom mode. Meanwhile, when the current driving mode of the vehicle is the first custom mode, the processor 150 may switch the first custom mode to a driving mode corresponding to the system logic. In the instant case, the driving mode corresponding to the system logic may be a driving mode set as a default or a driving mode prior to use of the first custom mode.

As yet another example, after setting the first button 111 to the 'N-CUSTOM 1' mode function, when the operation of the first button 111 is detected, the processor 150 may determine whether the current driving mode of the vehicle is the N mode or the CUSTOM 1 mode. When the current driving mode of the vehicle is the N mode, the processor 150 may change the driving mode from the N mode to the CUSTOM 1 mode. Furthermore, the processor 150 may change (switch) the driving mode from the CUSTOM 1 mode to the N mode when the current driving mode of the vehicle is the CUSTOM 1 mode. Furthermore, when the current driving mode of the vehicle is neither the N mode nor the CUSTOM 1 mode, the processor 150 may change the driving mode to the N mode.

As yet another example, when the second button 112 is set to the 'DRIVE MODE' function and then the input of the second button 112 is generated, the processor 150 may determine whether the current driving mode of the vehicle is one of the normal mode, the sports mode and the eco mode. When the current driving mode of the vehicle is not any one of the normal, sports and eco modes, the processor 150 may change the driving mode to a driving mode corresponding to the system logic. Furthermore, when the current driving mode of the vehicle is one of the normal, sports and eco modes, the processor 150 may change to the next mode in a specified order. In other words, when the current driving mode is the normal mode, the processor 150 may change to the sports mode. When the current driving mode is the sports mode, the processor 150 may change to the eco mode. When the current driving mode is the eco mode, the processor 150 may change to the normal mode.

Figure 8:
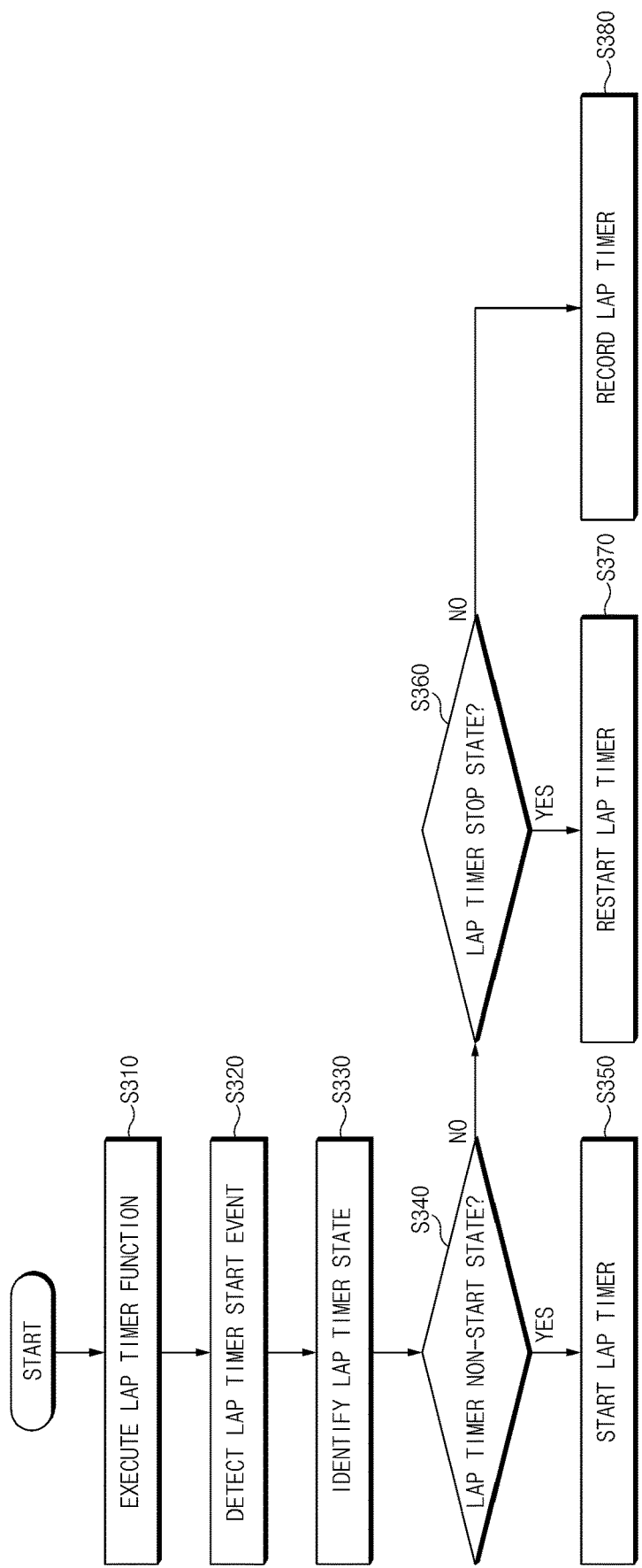
FIG. 8 is a flowchart illustrating a vehicle control method according to various exemplary embodiments of the present invention.

FIG. 8 is a flowchart illustrating a vehicle control method according to various exemplary embodiments of the present invention. In various exemplary embodiments of the present invention, a case in which the lap timer start function and the lap timer stop/initialization function are mapped to the first button 111 and the second button 112 will be referred to as an example.

In S310, the processor 150 may execute the lap timer function in a response to a user input. The processor 150 may receive input data corresponding to a user's manipulation from the user interface device 120. When executing the lap timer function, the processor 150 may display the lap timer execution screen on the display device.

In S320, the processor 150 may detect a lap timer start event. The processor 150 may recognize the lap timer start event generated by the operation of the first button 111.

When the lap timer start event is detected, in S330, the processor 150 may identify a lap timer state. The lap timer state may be classified into a lap timer non-start state, a lap timer start state, and a lap timer stop state.

In S340, the processor 150 may determine whether the lap timer state is a state in which the lap timer is not started (non-start state).

When the lap timer does not start, in S350, the processor 150 may start the lap timer.

When it is determined in S340 that the lap timer state is not a state in which the lap timer does not start, the processor 150 may determine whether the lap timer is stopped (stop state) in S360.

When it is determined that the lap timer is stopped, the processor 150 may resume the operation of the lap timer in S370.

When it is determined that the lap timer is not in a stop state, the processor 150 may record the current value of the lap timer in S380. When the lap timer is running, the processor 150 may read the current timer value from the lap timer and store the current timer value in the storage 130.

Figure 9:
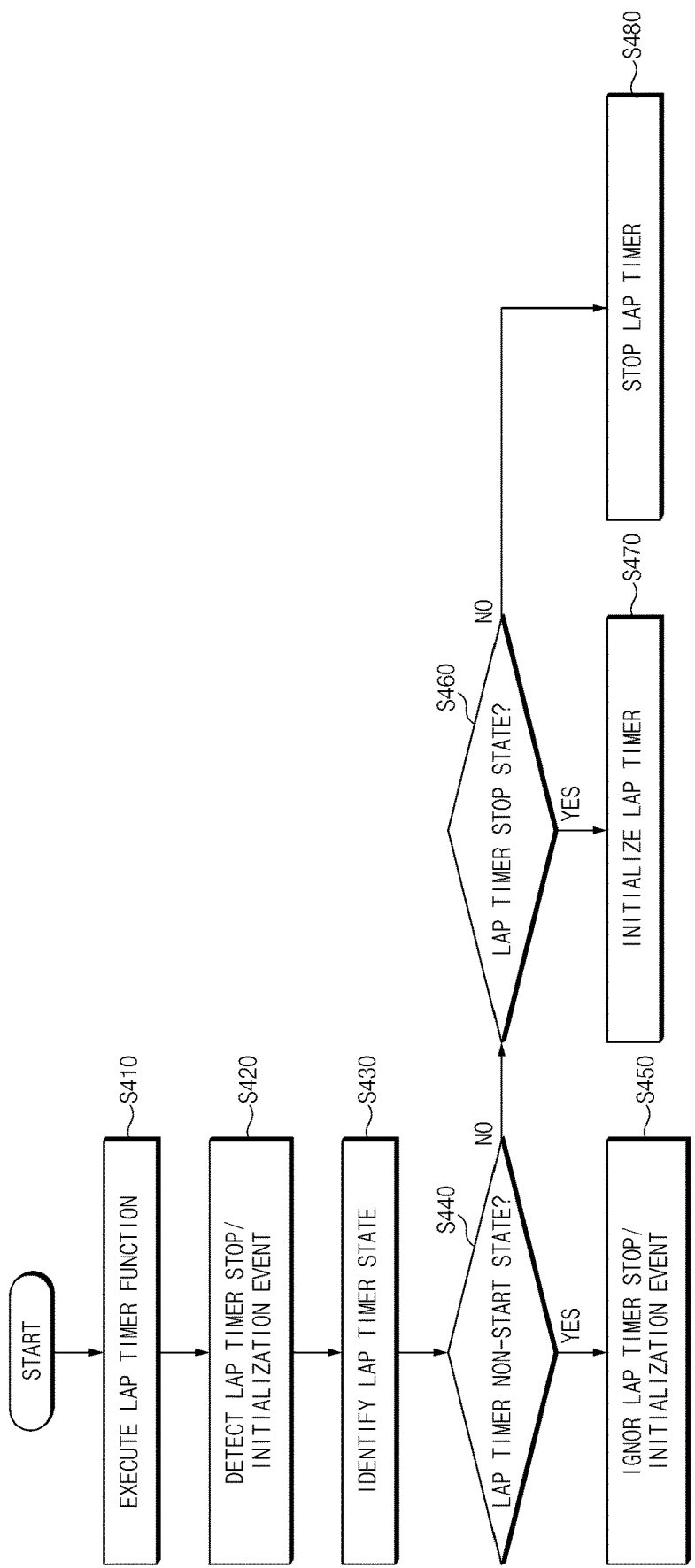
FIG. 9 is a flowchart illustrating a vehicle control method according to various exemplary embodiments of the present invention.

FIG. 9 is a flowchart illustrating a vehicle control method according to various exemplary embodiments of the present invention. In various exemplary embodiments of the present invention, a case in which the lap timer start function and the lap timer stop/initialization function are mapped to the first button 111 and the second button 112 will be described as an example.

In S410, the processor 150 may execute a lap timer function according to a user input. The processor 150 may receive input data according to a user's manipulation from the user interface device 120. When executing the lap timer function, the processor 150 may display the lap timer execution screen on the display device.

In S420, the processor 150 may detect a lap timer stop/initialization event. The processor 150 may recognize the lap timer stop/initialization event generated by the operation of the second button 112.

When the lap timer stop/initialization event is detected, the processor 150 may identify the lap timer state in S430.

In S440, the processor 150 may determine whether the lap timer state is the lap timer non-start state. The processor 150 may determine whether the lap timer has not started operation.

When the lap timer is in a non-start state, in S450, the processor 150 may ignore the lap timer stop/initialization event. The processor 150 may maintain the lap timer non-start state.

When the lap timer state is not the lap timer non-start state in S440, the processor 150 may determine whether the lap timer is stopped in S460.

When it is determined that the lap timer is stopped, the processor 150 may initialize the lap timer in S470. The processor 150 may initialize the value of the lap timer to '00:00:00'.

When it is determined that the lap timer is not stopped, the processor 150 may stop the lap timer in S480. When it is determined that the lap timer is running, the processor 150 may stop the lap timer.

According to various exemplary embodiments of the present invention, because vehicle functions having a high frequency of use by a user may be mapped to a plurality of buttons provided on a steering wheel, convenience may be provided to the user.

Furthermore, according to various exemplary embodiments of the present invention, it is possible to rapidly use a vehicle function desired by a user only by manipulating a button mounted on a steering wheel.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus of controlling a vehicle, the apparatus comprising:
    at least two buttons provided on a steering wheel of the vehicle;
    a processor electrically connected to the at least two buttons; and
    a storage electrically connected to the processor and configured to store instructions executed by the processor,
    wherein the processor is configured to:
        map and set a vehicle function to the at least two buttons,
        detect a button operated among the at least two buttons, and
        perform a vehicle function mapped to the operated button based on the vehicle function mapped to the operated button and a current vehicle state, and
    wherein the processor is configured to set a lap timer start function to a button of the at least two buttons, and to automatically set a lap timer stop and initialization function to a remaining button of the at least two buttons.

2. The apparatus of claim 1, wherein the processor is configured to map a driving mode function having a vehicle feature to the at least two buttons on a one-to-one basis.

3. The apparatus of claim 2, wherein the processor is configured to:
    compare a driving mode corresponding to the driving mode function with a current driving mode of the vehicle when the processor concludes that the vehicle function mapped to the operated button is the driving mode function, and
    change a driving mode of the vehicle to the driving mode corresponding to the driving mode function when the processor concludes that the driving mode corresponding to the driving mode function is inconsistent with the current driving mode.

4. The apparatus of claim 3, wherein the processor is configured to change the driving mode of the vehicle to a default driving mode corresponding to a system logic or a previous driving mode when the processor concludes that the driving mode corresponding to the driving mode function matches the current driving mode.

5. The apparatus of claim 3, wherein the processor is configured to change the driving mode of the vehicle to a next driving mode in a predetermined order when the processor concludes that the driving mode corresponding to the driving mode function matches the current driving mode.

6. The apparatus of claim 1,
    wherein the processor is configured to start a lap timer when an operation of the button to which the lap timer start function is set is detected in a state in which the lap timer is not started, and
    wherein the processor is configured to ignore an input of a corresponding button when an operation of the corresponding button to which the lap timer stop and initialization function is set is detected.

7. The apparatus of claim 6, wherein the processor is configured to:
    read and record a timer value from the lap timer when the operation of the button to which the lap timer start function is set is detected in a state in which the lap timer is started, and
    stop the lap timer when the operation of the button to which the lap timer stop and initialization function is set is detected.

8. The apparatus of claim 6, wherein the processor is configured to:
    restart the lap timer when the operation of the button to which the lap timer start function is set is detected in a state in which the lap timer is stopped, and
    initialize the lap timer when the operation of the button to which the lap timer stop and initialization function is set is detected.

9. The apparatus of claim 1, wherein the processor is configured to output, to a display device, information on guiding changes in a vehicle state corresponding to the performing of the vehicle function mapped to the operated button.

10. A method of controlling a vehicle, the method comprising:
    mapping and setting, by a processor, a vehicle function to at least two buttons provided on a steering wheel of the vehicle;
    detecting, by the processor, a button operated among the at least two buttons;
    identifying, by the processor, a vehicle function mapped to the operated button; and
    performing, by the processor, the vehicle function mapped to the operated button based on the identified vehicle function and a current vehicle state,
    wherein the setting of the vehicle functions includes:
        setting a lap timer start function to a button of the at least two buttons, and automatically setting a lap timer stop and initialization function to a remaining button of the at least two buttons.

11. The method of claim 10, wherein the setting of the vehicle functions includes:
mapping a driving mode function having a vehicle feature to the at least two buttons on a one-to-one basis.

12. The method of claim 11, wherein the performing of the vehicle function includes:
comparing a driving mode corresponding to the driving mode function with a current driving mode of the vehicle when the vehicle function mapped to the operated button is the driving mode function; and
changing a driving mode of the vehicle to the driving mode corresponding to the driving mode function when the processor concludes that the driving mode corresponding to the driving mode function is inconsistent with the current driving mode.

13. The method of claim 12, wherein the performing of the vehicle function includes:
changing the driving mode of the vehicle to a default driving mode corresponding to a system logic or a previous driving mode when the processor concludes that the driving mode corresponding to the driving mode function matches the current driving mode.

14. The method of claim 12, wherein the performing of the vehicle function includes:
changing the driving mode of the vehicle to a next driving mode in a predetermined order when the processor concludes that the driving mode corresponding to the driving mode function matches the current driving mode.

15. The method of claim 10, wherein the setting of the vehicle functions further includes:
outputting a pop-up, to a display device, indicating that the lap timer stop and initialization function is automatically set to the remaining button when the lap timer start function is set to the button of the at least two buttons.

16. The method of claim 10, wherein the performing of the vehicle function includes:
starting a lap timer when an operation of the button to which the lap timer start function is set is detected in a state in which the lap timer is not started; and
ignoring an input of a corresponding button when an operation of the corresponding button to which the lap timer stop and initialization function is set is detected.

17. The method of claim 10, wherein the performing of the vehicle function includes:
reading and recording a timer value from the lap timer when the operation of the button to which the lap timer start function is set is detected in a state in which the lap timer is started; and
stopping the lap timer when the operation of the button to which the lap timer stop and initialization function is set is detected.

18. The method of claim 10, wherein the performing of the vehicle function includes:
restarting the lap timer when the operation of the button to which the lap timer start function is set is detected in a state in which the lap timer is stopped; and
initializing the lap timer when the operation of the button to which the lap timer stop and initialization function is set is detected.

* * * * *